(No Model.) 2 Sheets—Sheet 1.
A. PARTRIDGE.
TRUCK WHEEL.
No. 319,844. Patented June 9, 1885.
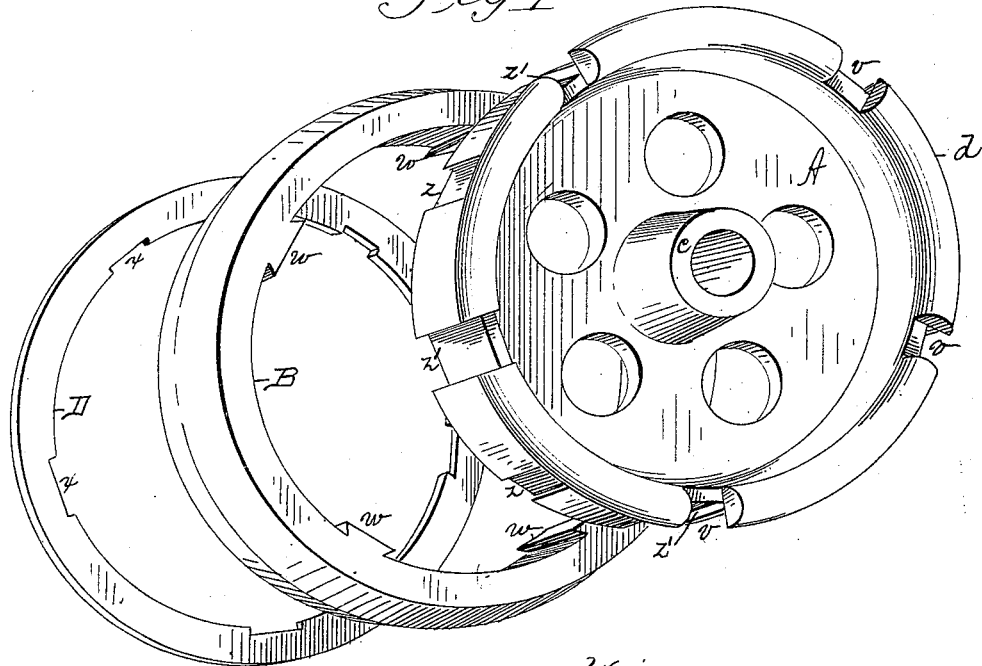
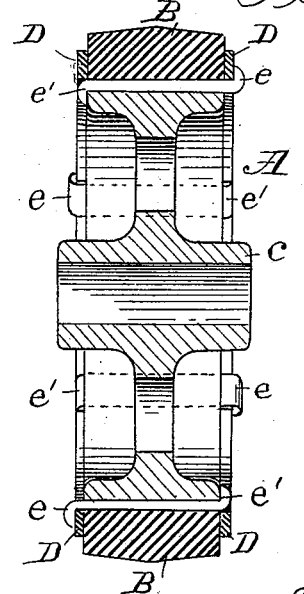
WITNESSES:
INVENTOR
Andrew Partridge
BY
Henry A. Chapin
ATTORNEY (No Model.) 2 Sheets—Sheet 2.
A. PARTRIDGE.
TRUCK WHEEL.
No. 319,844. Patented June 9, 1885.
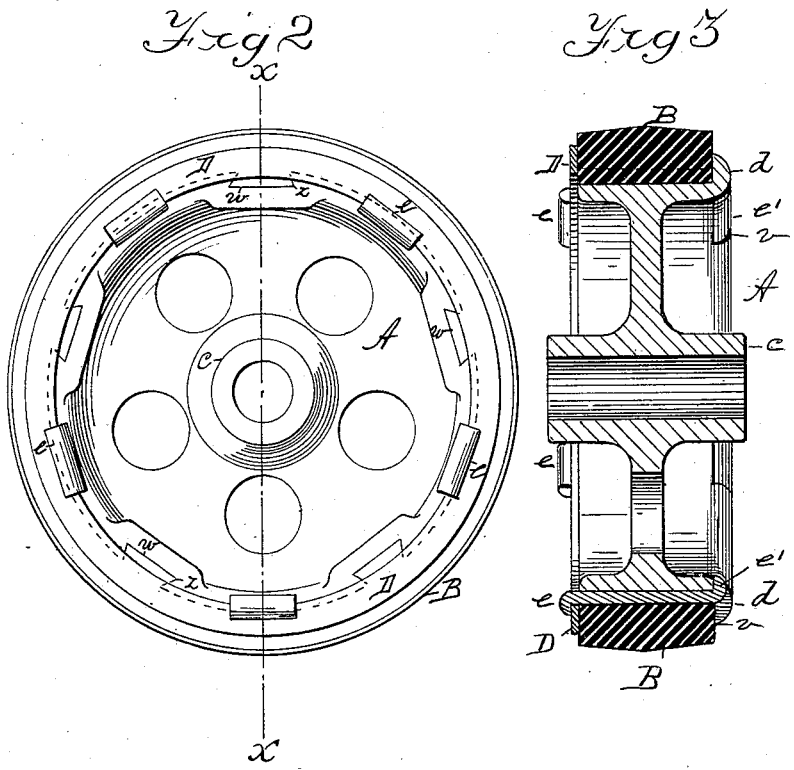
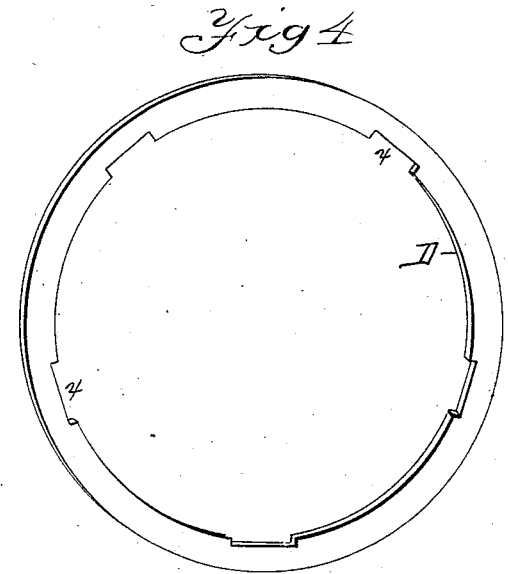
WITNESSES:
INVENTOR
Andrew Partridge
BY Henry A. Chapin
ATTORNEY

UNITED STATES PATENT OFFICE.

ANDREW PARTRIDGE, OF SPRINGFIELD, MASSACHUSETTS, ASSIGNOR OF FIVE-EIGHTHS TO HENRY E. WILKINS AND HENRY A. CHAPIN, BOTH OF SAME PLACE.

TRUCK-WHEEL.

SPECIFICATION forming part of Letters Patent No. 319,844, dated June 9, 1885.

Application filed May 4, 1885. (No model.)

*To all whom it may concern:*

Be it known that I, ANDREW PARTRIDGE, a citizen of the United States, residing at Springfield, in the county of Hampden and State of Massachusetts, have invented new and useful Improvements in Truck and Other Wheels, of which the following is a specification.

This invention relates to improvements in truck and caster wheels, the object being to provide improved means for constructing such and similar wheels with elastic tires of rubber or other suitable resilient material, whereby said tires are easily and economically applied and secured to metallic and other wheels.

In the drawings forming part of this specification, Figures 2 and 3 are respectively a side elevation and a transverse section (on line $x\,x$, Fig. 2) of an elastic-tired wheel constructed according to my invention. Fig. 1 is a perspective view of the wheel, the tire, and a side ring forming parts of the completed wheel. Fig. 4 is a plan view of said ring, and Fig. 5 is a perspective view of the tire-locking key. Fig. 6 is a sectional view similar to Fig. 3, but showing a modified construction wherein the tire is restrained from lateral movement on the wheel by a ring or flange secured against each edge of the rim.

In the drawings, A is the wheel to which the elastic tire is applied, having the usual hub, $c$, and a flange, $d$, on one edge of its rim or face, projecting outwardly at right angles to said face. Said wheel A has the notches $v$ formed in the flange $d$, and opposite the latter, across the face of the wheel, are formed the grooves $z'$. Other transverse grooves, $z$, are formed in the face of wheel A, not extending through said flange, and having, preferably, undercut or dovetail sides, as shown; but said sides may be made at right angles to the base of the groove.

B is the elastic tire of the wheel, made preferably of rubber, and slightly wider than the rim of the wheel A, of suitable elasticity, and having raised transverse portions $w$ across its inner face, adapted to fit into the aforesaid grooves $z$ in the face of the wheel A, said raised portions $w$ aiding in properly securing the tire to the wheel, and in preventing it from moving or turning on the latter under a heavy load. If desired, the wheel may be made without the grooves $z$, and the tire without the projections $w$. The key $e$, Fig. 5, of malleable metal, is provided with a suitable head to bear against the outer surface of the ring D, as in Figs. 2, 3, and 6, or directly against the edge of the tire B, as may be preferred, and is adapted to be driven or forced through one of the grooves, $z'$, of the wheel, between the face of the latter and the tire B, and have its projecting end $e'$ bent over the edge of the rim of the wheel A, between the sides of the notches $v$ therein, thereby compressing the tire transversely and securely locking the latter on the wheel. Several of the said keys (more or less) are used on each wheel, according to the circumference of the latter and the use to which the wheel is subjected, whether for suppporting heavy loads or otherwise.

In securing the tire B to the wheel, the flat metallic ring D is employed, preferably, particularly in large wheels; but for certain wheels it may be omitted, and the heads of the said keys $e$ be made of suitable size and to bear directly against the edge of the tire B. The said ring D is provided with notches $x$ in its inner edge, which correspond in position to the grooves $z'$ in the rim of the wheel A, whereby said notches engage with the keys $e$ when the parts are all assembled in the finished wheel, as in Fig. 2, and the ring is permitted to have a bearing against the edge of the rim of the wheel, as shown in dotted lines in said figure, as well as against the edge of the tire.

The construction of the herein-described rubber-tired wheel does not necessarily involve a wheel having the flange $d$ on one edge of the rim integral therewith, but the wheel may, as shown in Fig. 6, have the ring D applied and secured against both edges of the tire by the keys $e$, by simply arranging the latter so that the heads thereof come alternately on opposite sides of the wheel.

It is obvious that it is more economical to make the wheel with the fixed flange $d$ thereon, for the latter is cast with the wheel; but the ring D, on one or both sides, when secured thereon by the keys e, as aforesaid, constitutes a suitably firm and rigid abutment for each edge of the tire B under any circumstances.

The wheel A may be made of metal, cast in the usual way, or of hard wood or other suitable material, and the ring or rings D may be secured to the edge of the rim of the wheel by any suitable means other than the keys e.

When the tire is secured to the wheel by the heads of the keys e, having a bearing directly against the edge of the tire, and the ring or rings are omitted, the heads of the keys are arranged alternately on opposite sides of the tire, as aforesaid, and in such a construction the transverse grooves in the rim of the wheel, through which the keys e pass, may, if desired, be made in the inner side of the tire instead of in the wheel.

What I claim as my invention is—

1. In an elastic-tired truck or similar wheel, a wheel having a flange on one edge of its rim projecting outwardly at right angles to the face of said rim, a series of transverse grooves in the latter, a portion of which extend through said flange, an elastic tire having transverse projections on its inner side to enter certain of said grooves in the face of the wheel, a ring to bear against one edge of the tire, and a series of keys passing between the wheel-rim and the tire having their heads bearing against said ring and their ends engaged with the opposite edge of the wheel-rim, all combined substantially as set forth.

2. In an elastic-tired truck or similar wheel, a wheel having a series of transverse grooves in its rim or face, combined with an elastic tire having transverse projections on its inner side to enter certain of said grooves in the face of the wheel, a ring bearing against each edge of the tire, and a series of keys passing between the wheel-rim and the tire having their heads bearing against the sides of the said rings and their ends engaged with the edges of the wheel-rim, substantially as set forth.

3. In an elastic-tired truck or similar wheel, a wheel having a series of transverse grooves in its rim or face, combined with an elastic tire, a ring bearing against each edge of the latter, and a series of keys passing between the wheel-rim and the tire having their heads bearing against the sides of said rings and their ends engaged with the edges of the wheel-rim, substantially as set forth.

4. In an elastic-tired truck or similar wheel, a wheel having a series of transverse grooves in its rim or face, combined with an elastic tire having transverse projections on its inner side to enter certain of said grooves in the face of the wheel, and a series of keys passing between the wheel-rim and the tire having their heads bearing against the edges of the latter and their ends engaged with the edges of the wheel-rim, substantially as set forth.

5. In an elastic-tired truck or similar wheel, a wheel having a series of transverse grooves in its rim or face whose sides are undercut, combined with an elastic tire having transverse projections of dovetail form on its inner side to enter said grooves in the face of the wheel, and a series of keys passing between the wheel-rim and the tire having their heads bearing against the edges of the latter and their ends engaged with the edges of the wheel-rim, substantially as set forth.

ANDREW PARTRIDGE.

Witnesses:
  WM. H. CHAPIN,
  J. D. GARFIELD.